C. L. HEISLER.
PIPE EXPANDING AND BEADING MACHINE.
APPLICATION FILED JAN. 30, 1914.
1,114,351.
Patented Oct. 20, 1914.
3 SHEETS—SHEET 3.
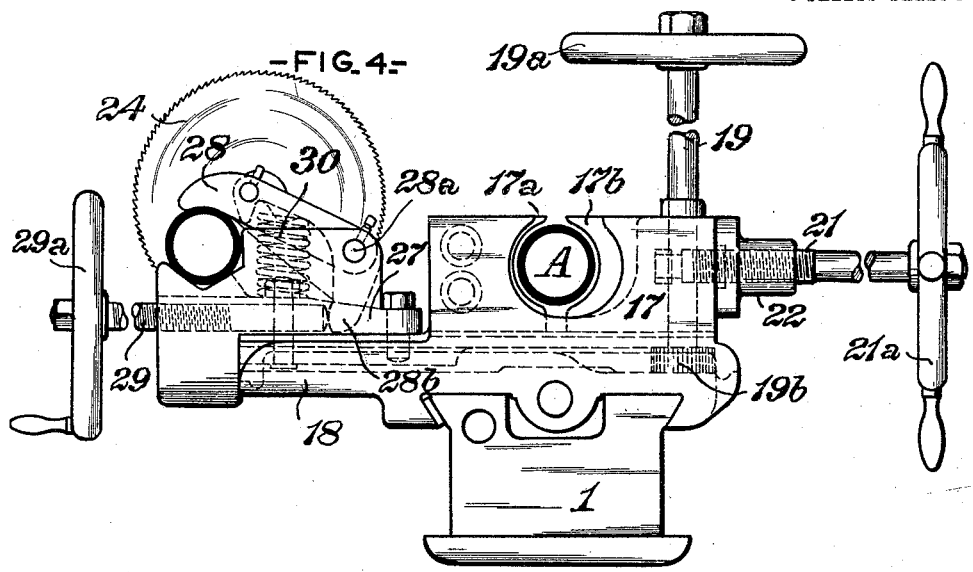
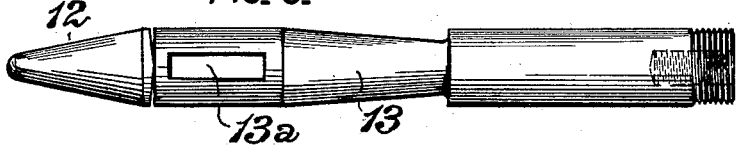
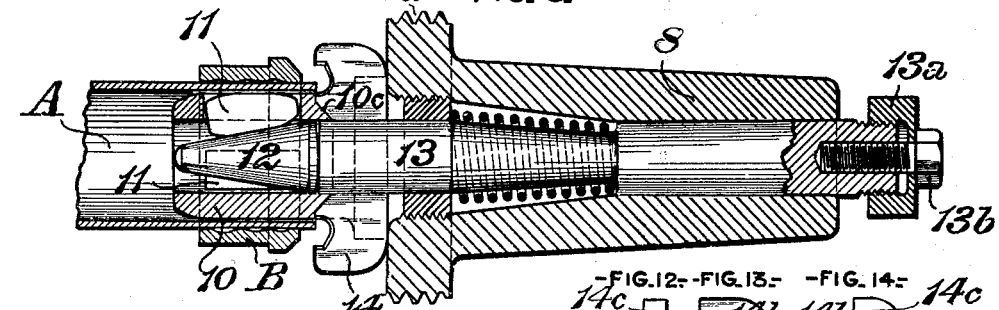
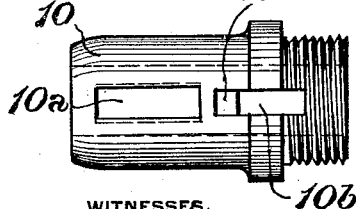

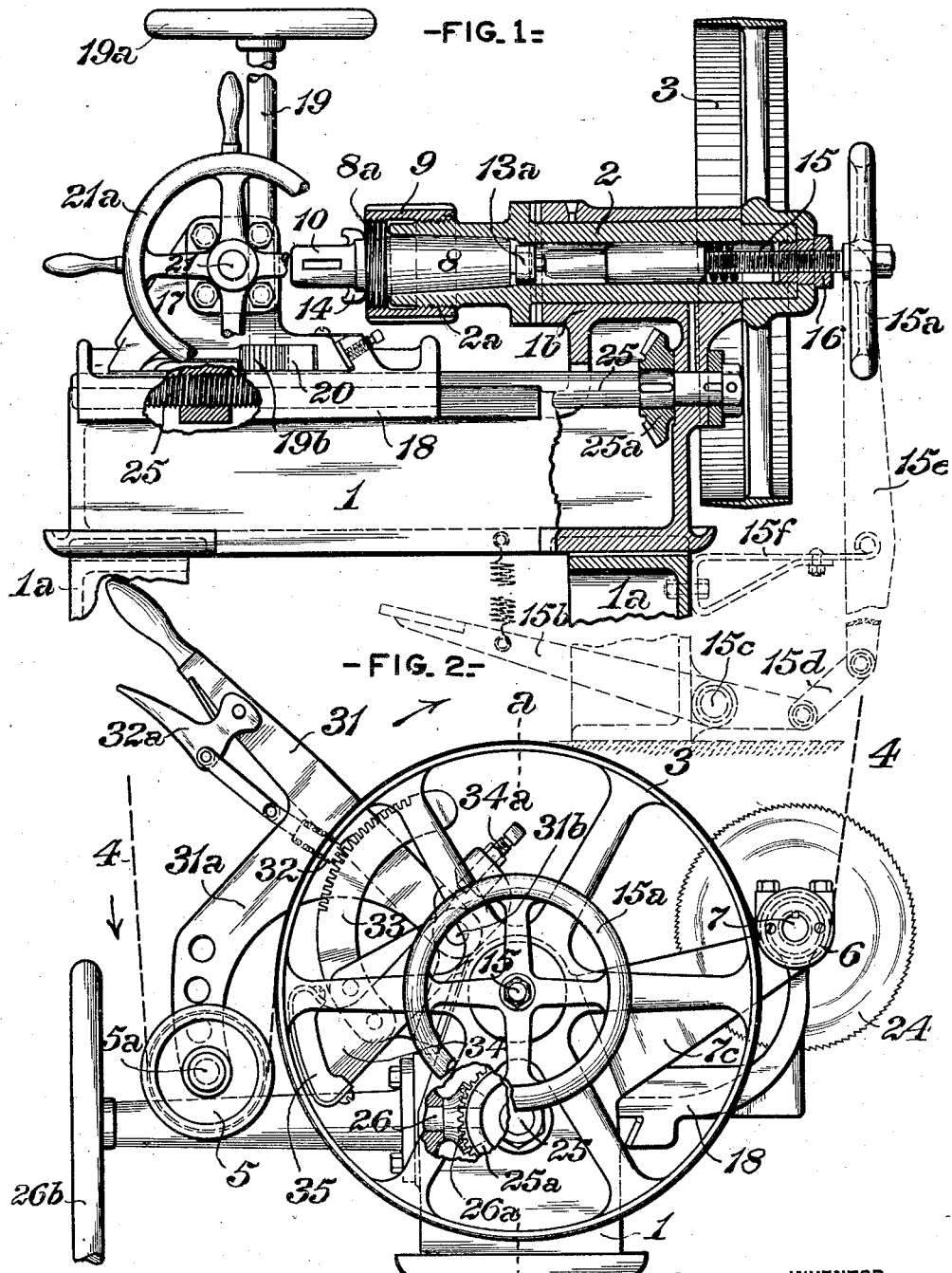

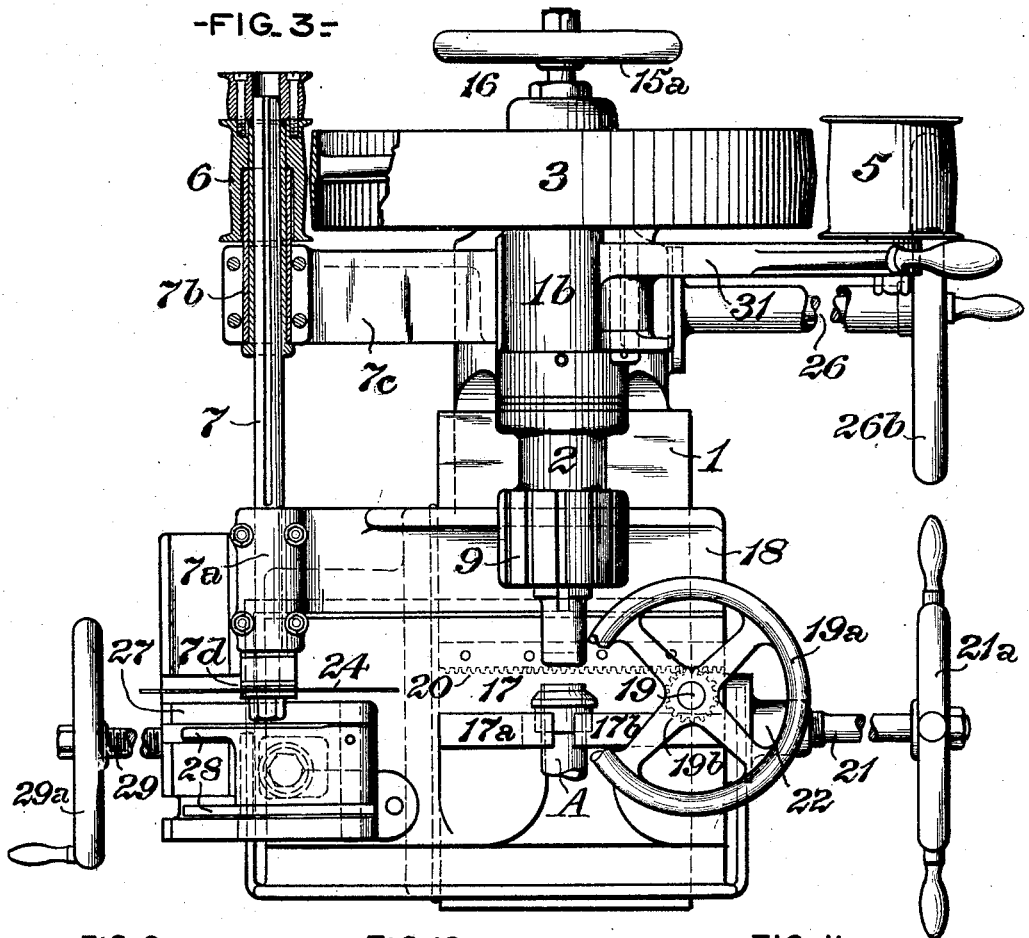
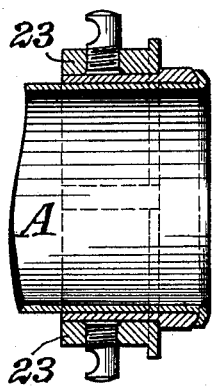
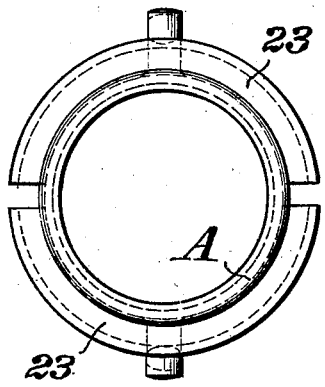
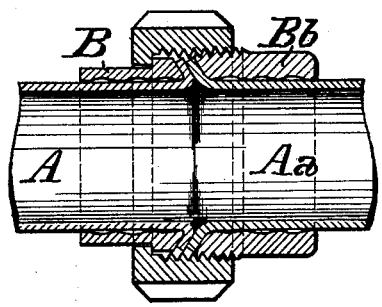

UNITED STATES PATENT OFFICE.

CHARLES L. HEISLER, OF SCHENECTADY, NEW YORK.

PIPE EXPANDING AND BEADING MACHINE.

1,114,351.	Specification of Letters Patent.	Patented Oct. 20, 1914.

Application filed January 30, 1914. Serial No. 815,340.

*To all whom it may concern:*

Be it known that I, CHARLES L. HEISLER, of Schenectady, in the county of Schenectady and State of New York, have invented a certain new and useful Improvement in Pipe Expanding and Beading Machines, of which improvement the following is a specification.

The object of my invention is to provide simple, effective, and rapidly operable means for expanding the ends of metal pipes into the sleeves or connectible bodies of pipe couplings, and properly beading or flanging the end of a pipe to form a tight joint with the similarly prepared end of another pipe.

A further object is to provide means for preventing the injury to copper pipes which results from overheating, as in the old method of brazing the pipe to the coupling member, thereby insuring a thoroughly reliable and uniformly perfect product, which is specially suited to the requirements of high steam pressure service in locomotives operating under the conditions of present standard practice.

The machine is especially designed and adapted for expanding and beading curved pipes, such as used on locomotives; these pipes are often bent, near the ends which are to be coupled, on a 6 inch, or even a 3 inch radius, and sometimes the pipes are of double curvature, like a letter S. The work of attaching the ends of such pipes to the coupling sections is done very rapidly and efficiently on this machine.

The improvements claimed are hereinafter fully set forth.

In the accompanying drawings: Figure 1 is a side view, partly in section on the line *a a* of Fig. 2, of a pipe expanding and beading machine, illustrating an embodiment of my invention; Fig. 2, an end view of the same, as seen from the right; Fig. 3, a plan or top view, partly in section; Fig. 4, an end view, as seen from the left; Fig. 5, a longitudinal central section, on an enlarged scale, through the expander, the end of a pipe section operated on, and the tubular shank; Fig. 6, a view, in elevation, of the radial adjustment stem and cone of the expander; Fig. 7, a side view of the expander housing plug; Fig. 8, an end view of the same; Fig. 9, a longitudinal central section through the end portion of a pipe and two half bushings thereon; Fig. 10, an end view of the same; Fig. 11, a longitudinal central section through a pipe coupling and two pipe sections beaded thereinto by a machine embodying my invention; Fig. 12, an edge view of a beader adapted to turn the end of the left hand pipe section shown in Fig. 11; Fig. 13, a side view of the same; Fig. 14, a similar view of a beader adapted to turn the end of the right hand pipe section shown in Fig. 11; and, Figs. 15 and 16, transverse sections, on the lines *b b* and *c c*, respectively, of Figs. 13 and 14.

Referring to the drawings, in the practice of my invention I provide a bed or supporting frame, 1, of metal, which rests upon legs or standards, $1^a$, and has formed upon or fixed to its top, at one end thereof, a bearing, $1^b$, in which a tubular spindle, 2, is rotatably mounted. A pulley, 3, is fixed upon the spindle, 2, to which rotation is imparted from any suitable prime mover by a belt, 4, passing partially around the pulley, 3, an idler pulley, 5, and a pulley, 6, fixed upon a saw arbor, 7, hereinafter described, the pulleys, 5, and 6, being disposed on opposite sides of the spindle, 2. A tubular tapered shank, 8, is fitted within a correspondingly tapered portion of the bore of the spindle, 2, and is detachably secured to the spindle by a nut, 9, which engages a coarse thread, $8^a$, on one end of the shank, and a finer thread, $2^a$, cut on the spindle, near the adjoining end thereof, thereby providing convenient means for the attachment and detachment of the expanding and beading appliance shown assembled in Figs. 1 and 5.

The expanding and beading appliance comprises the tubular shank, 8; a housing plug, 10, screwed into the bore of the end of said shank on the periphery of which the thread, $8^a$, is formed; expanding rollers, 11, fitted in the plug, 10; an expanding cone, 12; an adjustment stem, 13; and a beader, 14. The expanding rollers, 11, which are of conical form, and are fitted to rotate about their axes, on the inner periphery of a section of pipe, A, which is to be expanded, are held in proper relative position in slots, $10^a$, formed in the housing plug, 10. The expanding cone, 12, bears against the peripheries of the expanding rollers, 11, and forces them radially outwardly, against the inner surface of the pipe section, A, when moved to the left by the radial adjustment stem, 13, which is fitted in the bore of the shank, 8, and abuts against the right hand end of the expanding cone. The right hand end of the adjustment stem, is threaded and engaged by a cap nut, 13$^a$, which is further secured to the adjustment stem by a bolt, 13$^b$. The cap nut, 13$^a$, is set on the adjustment stem in such position as to abut against the adjacent end of the shank, 8, when the adjustment stem has moved sufficiently far to the left to move the rollers, 11, so far outwardly as to effect the amount of expansion required to secure the pipe section, A, against longitudinal movement in the coupling section, B, to which it is to be attached, when moved endwise against the rotating beader, 14. The expanding cone, 12, and adjustment stem, 13, may, if preferred, be made in a single piece, for simplification and economy of construction, in which case the rollers, 11, rotate upon the lubricated surface of the cone, 12, which rotates with the adjustment stem, 13, and shank, 8. The adjustment stem is returned to the neutral or initial position shown in Fig. 5, by a helical spring, 13$^a$, bearing on a shoulder upon it and on the adjoining end of the housing plug, 10, when an actuating member hereinafter described is withdrawn from bearing on the head of the bolt, 13$^b$, and, as indicated in Fig. 5, the plug and expanding rollers will be in position to freely enter the end of a pipe section.

The ends of the pipe sections are turned over by beaders, 14, which are metal plates of the form shown in Figs. 12 to 16 inclusive, one of which is fitted in a longitudinal slot, 10$^b$, formed in the housing plug, between the slots which receive the rollers, 11, and the end of the plug which adjoins the shank, 8, and through a slot, 13$^a$, in the adjustment member, the latter slot being of sufficient length to admit of the required longitudinal movement of the adjustment stem, without exerting bearing on the beader, which is held centrally in the slot, 10$^b$, by oppositely inclined teeth, 14$^a$, on its working face, which abut against inclined faces, 10$^c$, at the ends of the slot, 10$^b$. The beader is securely clamped between said faces and the end of the shank, 8, when the housing plug, 10, is screwed thereinto.

Beading recesses, 14$^b$, are formed in the faces of the beaders, 14, adjoining the teeth, 14$^a$, which faces are suitably hardened, the form of said recesses being such as will bend the end of a pipe section to the inclination or curvature desired to fit against the inwardly or outwardly inclined or curved end of a pipe coupling section. Thus, the beader shown in Fig. 13 is adapted to turn the end of the pipe section A (Fig. 11) into form to bear against the end of the coupling section, B, and that shown in Fig. 14, to turn the end of the pipe section A$^a$ into form to bear against the end of the coupling section B$^b$. The surfaces of the beading recesses are hardened, polished, and rounded, as indicated in Fig. 16, and the beading recesses may be made of such form as to give any desired shape to the beaded or flanged ends of the pipe sections. Cutting edges, 14$^c$, are formed at the outer ends of the beading recesses, these edges being shown as disposed approximately parallel with the axis of rotation, in Fig. 13, and approximately perpendicular to the surfaces of the beading recesses, in Fig. 14. The object of the cutting edges is to trim the abutting ends of the pipe sections to determined diameters, in order to insure uniform diameters which will match each other and properly fit in the coupling sections; also to cut off surplus material in case an excess of pipe stock, above that required for a desired bead or flange, has been permitted to project beyond a coupling section. The coupling sections may be either internally corrugated, as shown in Fig. 11, or be of plain cylindrical bore, as preferred.

The adjustment stem, 13, and expanding cone, 12, are moved in direction to effect the outward movement of the expanding rollers, 11, by an adjusting screw, 15, having a left handed thread which engages a nut, 16, by which the pulley, 3, is connected to the spindle, 2, said screw rotating in the direction indicated by the arrow, Fig. 2, with the pulley and spindle. A hand wheel, 15$^a$, is fixed on the outer end of the adjusting screw, 15, and the thread of the adjusting screw being, as before stated, left handed, any retardation of the hand wheel, 15$^a$, by the application of a braking friction by the hand or otherwise, coincidently effects the movement of the adjusting screw, 15, toward the cap nut, 13$^a$, and, through the adjustment stem, 13, and cone, 12, imparts to the expanding rollers, 11, the outward movement necessary to securely expand the pipe end in the coupling section. The degree of traverse of the adjusting screw is fixed by the predetermined adjustment of the space between the cap nut, 13$^a$, and the adjacent end of the tubular shank, 8. By turning the hand wheel in the direction of the upper arrow in Fig. 2, the adjusting screw is retracted, and the expanding rollers are permitted to return to their initial positions, when the machine is stopped, and usually just before inserting another pipe section.

If preferred, a double armed treadle lever, 15$^b$, may be fulcrumed, by a pin, 15$^c$, on one of the legs, 1$^a$, of the machine, as indicated in dotted lines in Fig. 1, and coupled, by a link, 15$^d$, to the lower arm of a vertical double armed lever, 15$^e$, which is pivoted on a bracket, 15$^f$, on the leg, 1$^a$, the upper arm of said lever transmitting longitudinal movement to the adjusting stem, 13, by bearing on the end of a plain or unthreaded rod, which, in this case, is substituted for the adjusting screw, 15. This structural modification avoids the necessity of stopping the machine and gives the operator free use of his hands.

The pipe section to be operated on is held in a vise, 17, which is provided with a fixed jaw, 17ª, and a movable jaw, 17ᵇ, and which is fitted to traverse on a cross slide, 18, on the bed, 1, at a right angle to the common axial line of the spindle, 2, and shank, 8, the cross slide being fitted to traverse on ways on the bed, parallel with said axial line. The vise is moved by the rotation of a vertical shaft, 19, having a hand wheel, 19ª, fixed on its upper end, and carrying, on its lower end, a pinion, 19ᵇ, which engages a rack, 20, on the cross slide, 18. After moving the vise sufficiently to clear the housing plug, 10, and beader, 14, the movable jaw, is opened to admit a pipe section, A, by a horizontal screw, 21, journaled in the vise, and carrying, on its outer end, a hand wheel, 21ª, said screw engaging a nut, 22, on the vise, and being coupled to the movable jaw, 17ᵇ. When necessary, half bushes, 23, Figs. 9 and 10, are inserted in the jaws of the vise, to reduce the circular opening between them to the diameter of the pipe section. After positioning the pipe coupling section in the vise jaws, the end of the pipe section is adjusted to project for a proper distance therefrom, or if preferred, the pipe coupling section may be applied to the pipe section before the latter is inserted in the vise.

After the pipe section and coupling section have been securely clamped in the vise, the latter is moved laterally by the rotation of the shaft, 19, as before described, until the pipe section is brought up to a saw, 24, by which the end projecting from the coupling section is cut off to the proper length to form a bead or flange. The saw, 24, is fixed upon the arbor, 7, journaled on the bed, 1, as before specified, and is rotated by the belt, 4, passing around the pulley, 6, fixed on one end of the arbor. After the pipe section has been cut to the proper length, the vise is returned to bring it into axial alinement with the spindle, 2, and shank, 8.

The cross slide, 18, carrying the vise, 17, and the pipe section clamped therein, is then moved into position for the action of the expanding and beading devices to be exerted on the pipe section. This movement is effected by the rotation of a traversing screw, 25, journaled in the bed, 1, parallel with and below the spindle, 2, and shank, 8, and carrying a bevel gear, 25ª, engaging a similar gear, 26ª, on a shaft, 26, which carries, on its opposite end, a hand wheel, 26ᵇ. The pipe section has, by this movement, been brought into position in which the housing plug, 10, enters the pipe section, after which, braking friction is applied to the wheel, 15ª, to adjust the expanding rollers. Further movement of the cross slide and pipe section, by the rotation of the hand wheel, 26ᵇ, in the same direction, forces the end of the pipe section against the rotating beader, 14, which beads, polishes, and trims the end of the pipe section to size. The expanding rollers, 11, have, meanwhile, completed their operation, and the wheel, 26ᵇ, is then turned in the opposite direction to move the cross slide into position for the removal of the finished pipe section from the machine, by opening the jaws of the vise. The machine is then stopped and the hand wheel, 15ª, is rotated in the direction of the upper arrow in Fig. 2, to collapse the expanding rollers for the next succeeding operation.

The arbor, 7, of the saw, 24, which latter may be of the ordinary construction, is disposed parallel with and adjacent to the spindle, 2, and is supported in a bearing, 7ª, on the cross slide, 18, and a bearing, 7ᵇ, on the end of a bracket, 7ᶜ, extending upwardly from the bed, 1. The arbor is fitted to move longitudinally through the pulley, 6, and bearing, 7ᵇ, in accordance with the movement of the saw, when the latter is carried by the cross slide, 18, on which its bearing, 7ª, is fixed. The object of causing the saw to move with the cross slide and vise, is to maintain a constant predetermined distance between the saw and the end of the fixed jaw, 17ª, nearer the expanding and beading devices, so that the sawed pipe end length will be constant and proper for beading. By making the flange thickness of the half bushes, 23, of proper amount for each pipe size, the pipe will always be cut to proper length for beading, regardless of its size, within the capacity of the machine. The saw may be adjusted on the arbor by washers, 7ᵈ.

For general use and for convenience in cutting off pipe, a pipe clamp is mounted on the cross slide, 18, said clamp comprising a V grooved base, 27, secured to the cross slide, and clamping fingers, 28, fulcrumed on a pin, 28ª, fixed to the base. A downwardly projecting lug, 28ᵇ, is formed integral with the clamping fingers, and a clamping screw, 29, journaled in the base, 27, and having a hand wheel, 29ª, on its outer end, abuts against said lug, and depresses the clamping fingers, to clamp a pipe section in the V groove of the base. A spring, 30, raises the clamping fingers, when released from the pressure of the screw, to permit the removal of the pipe section.

A simple and effective starting and stopping device is provided and is shown in Figs. 2 and 3, the same comprising an idler pulley, 5, journaled on a pin, 5ª, projecting from an arm, 31ª, on a lever, 31, pivotally supported on a pin, 31ᵇ, fixed to the bed, 1. A latch, 32, actuated by a latch handle, 32ª, pivoted to the lever, 31, engages the teeth of a quadrant, 33, fixed to the support of the lever, and the lever, when raised, abuts against a set screw, 34ᵃ, on a double armed lever, 34, the opposite end of which carries a brake shoe, 35, adapted to bear against the inner surface of the pulley, 3. By depressing the lever, 31, any desired tension may be applied to the driving belt, 4, and with reasonable care in applying this belt tension, the belt will slip before the bead on the pipe section is abraded or destroyed, when the pipe section is forced unduly hard against the beader. The saw will likewise stop, if excessively crowded, and by unlatching and lifting the lever, the machine can be instantly stopped to prevent accident, as a sufficient degree of such movement not only slackens the driving belt but also applies the brake.

I claim as my invention and desire to secure by Letters Patent:

1. In a pipe expanding and beading machine, the combination of a rotatory tubular spindle, means for maintaining a pipe in axial alinement therewith, means for rotating the spindle, means for expanding a pipe, means for beading the pipe, a housing plug carrying said expanding and beading means and connected detachably to the spindle, and adjusting means located within the tubular spindle and bearing on the expanding means.

2. In a pipe expanding and beading machine, the combination of a bed having a spindle bearing and slideways extending transversely thereto, a rotatory spindle journaled in said bearing, pipe expanding means carried by said spindle, a cross slide adapted to traverse on the slideways of the bed, a vise mounted adjustably on said cross slide, and means for traversing the cross slide parallel with the axis of the spindle.

3. In a pipe expanding and beading machine, the combination of a bed plate, a spindle journaled thereon, means for clamping a pipe and moving it axially toward and away from said spindle, expanding means carried by said spindle, manually operable means to force said expanding means radially outward, means to retract the same, and a fixed beading tool carried by said spindle in the rear of said expanding means and adapted to spin and polish the end of the pipe to form a tight joint without further treatment.

4. In a machine of the class described, the combination with the bed plate, of two parallel spindles journaled thereon, a cross-slide mounted on said bed-plate, means to move it parallel to the axes of said spindles, a cutting-off tool carried by one of said spindles and pipe expanding and beading means carried by the other, a bearing carried by said cross-slide in which the spindle carrying the cutting-off tool is longitudinally movable, pipe-clamping means mounted on said cross-slide and means for moving the same at right angles to the movement of the latter, and a common power means for rotating both said spindles.

CHARLES L. HEISLER.

Witnesses:
 LESTER E. WARNER,
 HENRY LINDENKOHL.

Copies of this patent may be obtained for five cents each, by addressing the "Commissioner of Patents, Washington, D. C."